United States Patent [19]

Otto

[11] Patent Number: 4,769,879
[45] Date of Patent: Sep. 13, 1988

[54] METHOD FOR MECHANICALLY CONDITIONING TEXTILE MATERIALS

[75] Inventor: Wolfgang K. F. Otto, Spartanburg, S.C.

[73] Assignee: Milliken Research Corporation, Spartanburg, S.C.

[21] Appl. No.: 654,029

[22] Filed: Sep. 24, 1984

Related U.S. Application Data

[63] Continuation of Ser. No. 274,173, Jun. 16, 1981, abandoned.

[51] Int. Cl.⁴ .................... D06C 19/00; D06C 15/14
[52] U.S. Cl. ............................................. 26/25; 26/27
[58] Field of Search .................... 26/1, 25, 26, 27, 28, 26/31, 32; 15/40, 89; 427/346, 358, 368

[56] References Cited

U.S. PATENT DOCUMENTS

| | | | |
|---|---|---|---|
| 300,964 | 6/1884 | Garnier | 26/1 |
| 502,903 | 8/1893 | Fries | 26/1 |
| 1,181,789 | 5/1916 | Morley | 26/25 |
| 2,196,256 | 4/1940 | Dreyfus et al. | 427/358 |
| 2,466,348 | 4/1949 | Ambye | 26/31 |
| 2,706,845 | 4/1955 | Swan | 26/1 |
| 2,730,113 | 1/1956 | Hadley | 26/25 X |
| 2,972,177 | 2/1961 | Bidgood, Jr. | 26/1 |
| 3,124,844 | 3/1964 | Constantine et al. | 26/28 X |
| 3,523,346 | 8/1970 | Bolen et al. | 26/28 X |
| 3,894,318 | 7/1975 | Ito et al. | 26/28 |

FOREIGN PATENT DOCUMENTS 102523 12/1923 Switzerland ......................... 15/89

Primary Examiner—Robert R. Mackey
Attorney, Agent, or Firm—H. William Petry; Earle R. Marden

[57] ABSTRACT

A continuous method is provided for mechanically conditioning a textile sheet material having a face and a back moving in a longitudinal direction, which comprises subjecting successive adjacent sections of both the face and back of the material across the entire width of the material to impact and friction with flexible impact means such that at least some simultaneous impact occurs with at least one impact means on the face of the material and at least one impact means on at least a portion of a corresponding section on the back of the material.

3 Claims, 2 Drawing Sheets

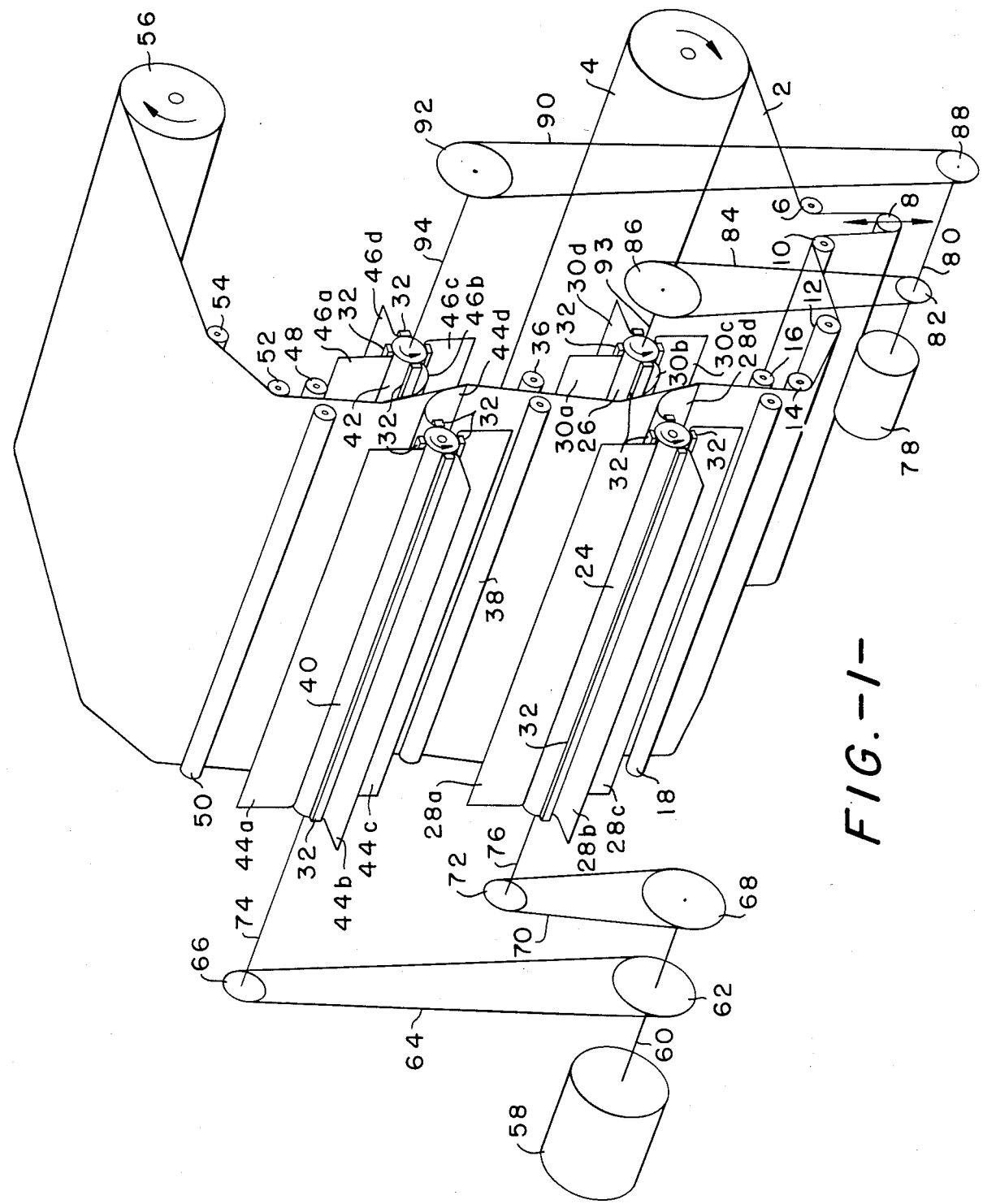
FIG.-1-

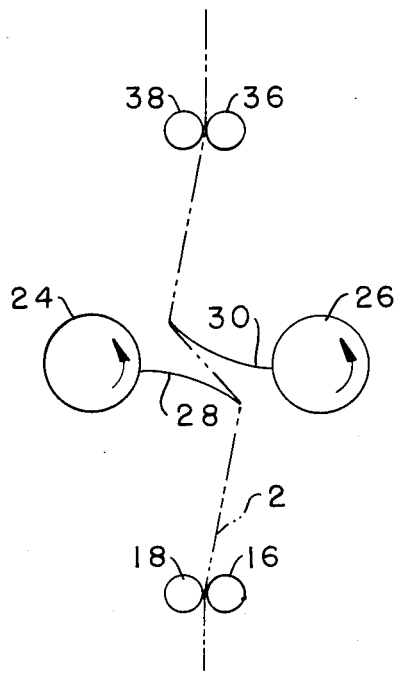
FIG.-2-
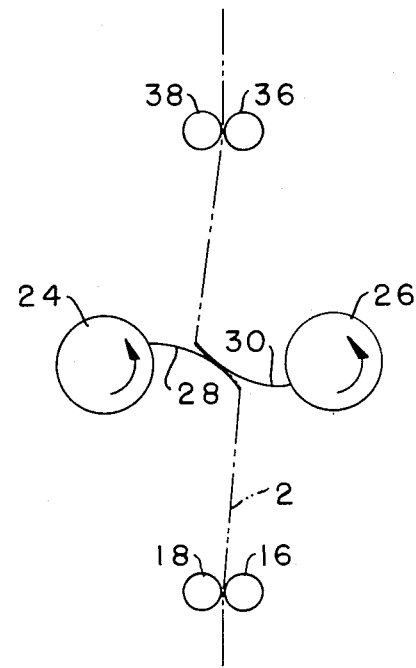
FIG.-4-
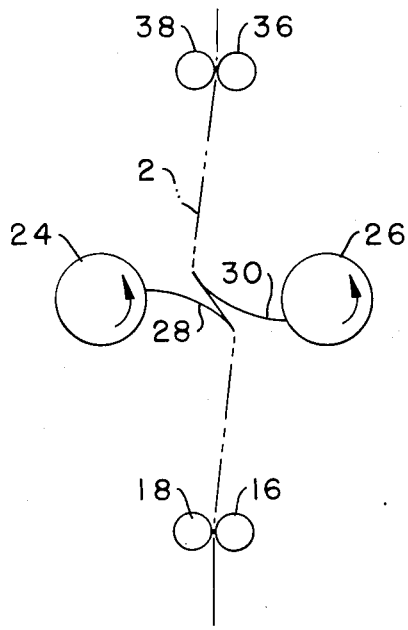
FIG.-3-
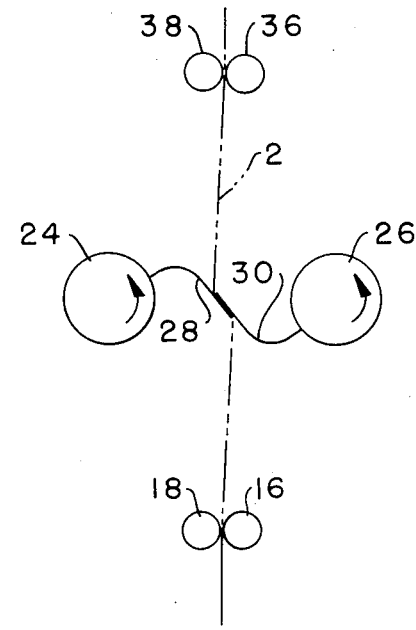
FIG.-5-

METHOD FOR MECHANICALLY CONDITIONING TEXTILE MATERIALS

This is a continuation of application Ser. No. 274,173 filed June 16, 1981; now abandoned.

This invention relates to a method and apparatus for mechanically conditioning textile materials and more particularly to a method and apparatus for treating textile materials to soften them and to provide them with a fuller hand without significantly adversely affecting either the surface of the material or its strength characteristics.

Textile materials, such as fabrics, may be characterized by a wide variety of complex functional and aesthetic characteristics which determine commercial success or failure of the material. Examples of typical functional characteristics of a material which may be regarded as important in the textile arts include strength, abrasion resistance, stretch, soil repellence, soil release, water and oil repellence, moisture absorption and moisture regain, etc. Typical aesthetic characteristics of a textile material which may be considered in its evaluation for a particular end use are color, pattern, texture, fabric "surface feel" and "hand." It is perhaps the latter two, difficult-to-define, aesthetic characteristics with which the subject matter of the present invention is most directly and clearly concerned; however, modification of those characteristics of a fabric may affect other functional or even aesthetic characteristics in a positive or negative way, and consequently, there may be occasion throughout this disclosure where reference to those other related and interdependent characteristics of a textile material may become relevant, requiring some discussion.

Concerning characteristics of a textile material which are most significant with regard to the process and apparatus of the present invention, namely those of fabric surface feel or hand, any quantification of those characteristics in manageable, easily understood terms has been largely unsuccessful. Out of necessity the art has developed a range of descriptive, subjective terms, which are understood and which convey highly relevant information to those skilled in the textile arts. Some terms which have been used to describe fabric hand include: light, heavy, bulky, stiff, soft, harsh, full, silky, papery, thin, raggy, and so forth.

The hand of a textile material, such as a fabric, is determined by the particular raw materials used in its construction, the size and shape of the fibers employed, fiber surface contour, fiber surface frictional characteristics, yarn size, type, e.g., filamentary or spun, construction of the fabric, e.g., woven, knit, fabric weight, by the chemical finishes applied to the fabric, such as softeners, and by the processing history, including any mechanical working, of the fabric. It is the last mentioned technique, that of mechanical working of the fabric, with which the process and apparatus of the present invention is most directly concerned.

A variety of techniques, some of which are used commercially today, are known in the textile art for mechanically conditioning textile sheet materials to change their aesthetic qualities. Such techniques include fulling techniques, Sanforizing, rubberbelting, jet rope scouring, and the technique of overfeeding the material on the tenter frame. The technique of mechanically impacting or beating textile materials, the general type of mechanical technique with which the present invention is concerned, has also been known for many years as can be determined by reference to the patent art in the United States. Such techniques have been disclosed, for instance, as early as the late 1800's in U.S. Pat. Nos. 87,330 and 373,193. The use of flexible beating means such as thongs inserted in a shaft or tube for improving the appearance of a wide variety of materials including textile materials is also known as disclosed, for instance, in U.S. Pat. No. 2,187,543. It is further known that both the face of the textile material and the back thereof may be simultaneously subjected to mechanical impact with an impact means. Such a technique is disclosed in U.S. Pat. No. 1,555,865. Exemplary of the more recent patent art on the subject of mechanical conditioning of textile materials is the so-called "button breaker" technique which is disclosed, for instance, in U.S. Pat. No. 3,408,709.

All of the presently known techniques for mechanically finishing textile materials, however, suffer from one or more significant disadvantages. In certain instances, the effect achieved may not be sufficiently significant to justify the additional processing step involved. The technique may not be performable on a continuous basis, or it may be so severe that it produces one or more undesirable effects upon other functional and/or aesthetic characteristics such as significant breaking of surface fibers or undue weakening of the overall strength of the textile material. It would thus be very desirable to provide a process and apparatus which can be employed to treat textile sheet materials continuously to achieve a desirable conditioning of the material, especially the hand thereof, while minimizing or eliminating undesirable effects upon other commercially important aesthetic and functional characteristics.

In accordance with the invention, a continuous method is provided for mechanically conditioning a textile sheet material having a face and a back moving in a longitudinal direction which comprises subjecting successive adjacent sections of both the face and back of the material across the entire width of the material to impact and friction with flexible impact means such that at least some simultaneous impact occurs with at least one impact means on the face of the material and at least one impact means on at least a portion of a corresponding section on the back of the material. The preferred impact means according to the invention may be flexible rotating flaps which even more preferably may be caused to rotate in the same direction so that being disposed on both the face and back of the material, they will be caused to impact one another with the material disposed between them causing significant impact and shearing forces to be applied to the material.

The present invention also relates to an apparatus by means of which the above-described method may be performed. Such apparatus comprises means for moving a textile sheet material in a longitudinal direction, means for intermittently subjecting successive adjacent sections of both the face and back of the material across the entire width of the material to impact and friction with flexible impact means such that at least some simultaneous impact occurs with at least one impact means on the face of the material and at least one impact means on at least a portion of a corresponding section on the back of the material. Preferably, the construction of the impact means and positioning thereof relative to the material should be such as to enhance not only the force of impact onto the textile material but also, and perhaps equally importantly, the shearing forces applied thereto as well.

According to an embodiment of the invention, the textile material may be heated above ambient temperature at the time of impact with the impact means. Such heating step may be performed at or just prior to impact. Typically, for a thermoplastic material, the material may be heated to a temperature just above the glass transition temperature of the material at the time of impact with the impact means.

In another embodiment of the apparatus and process, heating of the material may be performed, for instance, on a non-heat set material just after impacting with said impact means but preferably prior to the application of any substantial pressure or stretching forces to the material.

In yet another embodiment, a chemical may be applied to the textile material in an amount sufficient to enhance or change the effect achieved by means of the mechanical impacting step. Thus, for instance, where the textile material is made predominantly of a polymeric material the chemical may be a plasticizer for the polymeric material.

In general, the phrases "mechanical conditioning" or just "conditioning" as used herein refers to a change of fabric hand or other related or separate fabric characteristics such as bulk, fullness, softness, drape and thickness. The specific conditioning effect achieved may depend, not only upon the process and apparatus variables, such as impact and shearing forces applied to the fabric, but also upon the character and construction of the textile material, per se. Examples of such materials include pile fabrics, woven, knit, non-woven fabrics, as well as coated fabrics and the like. Examples of knit fabrics include double knits, jerseys, interlock knits, tricots, warp knit fabrics, weft insertion fabrics, etc. Woven fabrics may be plain weaves, twills or other well-known constructions. Such fabrics may be constructed from spun or filament yarns or may be constructed by using both types of yarns in the same fabric. Fabrics made from natural fibers such as wool, silk, cotton, linen may also be treated, although the preferred fabrics are those made from synthetic fibers such as polyester fibers, nylon fibers, acrylic fibers, cellulosic fibers, acetate fibers, their mixtures with natural fibers and the like.

A particularly noticeable and desirable softening effect upon textile materials has been observed in a preferred embodiment on resin finished fabrics made from a comparatively "open" construction, such as those having long "floats," e.g., twills. Resin finished fabrics made from low twist spun yarns may be particularly desirable to treat according to the invention, especially if they are also characterized by open construction. While the significant effect upon such materials has been observed repeatedly, it is not fully understood why such effect is particularly desirable in such instances. It is believed, however, with regard to such materials (although the invention is not to be limited to any such theory of the mechanism involved) that such desirable results ensue because of one or more of the following factors:

1. Comparatively easy access of the impact means to construction elements of the fabric;
2. Fracturing of fiber-to-fiber and yarn-to-yarn resin bonding due to the severe action of the compressive and shear forces applied to the material;
3. Significant relative mobility of yarns and fibers upon application of compressive and shear forces to the material; and
4. Potential for enhanced surface smoothness of the material upon application of the impact means, i.e., the impact flaps.

Another of the wide variety of conditioning effects that may be achievable by means of the process and apparatus of the present invention has been observed in yet another embodiment where range dyed fabrics are processed according to the invention. In this regard, it has been observed that continuous dyeing, that is range dyeing of fabrics, especially spun, polyester-cotton greige fabrics and polyester filament-containing fabrics, typically may provide products characterized as having a thin, papery, stiff and harsh hand. Commercial acceptability of such fabrics has thus frequently required application of a chemical softener to it to improve the hand characteristics. These softeners, however, may add undesirably to the cost of the final product; and they may wash out of the fabric, especially after repeated laundering. Jet dyeing of the identical greige fabric, which is a more expensive batch-type operation, by contrast, may provide a product having a very desirable smooth and full hand as well as good drape characteristics. Processing of such range dyed fabrics according to the present invention, however, may provide products having hand characteristics that are very similar, if not indistinguishable, from the corresponding jet dyed products.

In yet another embodiment, it has been observed the dimensions of certain fabrics may actually be caused to change in a desirable way. For instance, it has been observed that some fabrics may be caused to shrink upon being processed according to the invention in the length and/or in the width direction resulting in a change of the weight of the fabric per unit area. Furthermore, even if the fabric is stretched again to its original length and/or width and returned approximately to its original weight per unit area, the fabric may be characterized as having a fuller, bulkier hand.

In another embodiment, the process has been found to have a very desirable effect on the appearance and surface feel of a very variety of pile fabrics, such as tufted fabrics, plushes, velvets and the like. When employed on tufted fabrics such as, for example, upholstery fabrics, the process may accomplish an untwisting and "opening up" or separation of the fibers in the tufted yarns giving the resulting product a much fuller, much more uniform appearance. Such processing may also provide a much more desirable, softer, silkier, more luxurious surface feel to the fabric. On velvet fabrics, an enhancement of the fabric surface luster has been observed. Another desirable effect of the use of the process on pile fabrics may be the removal of undesired fiber fly and other loose materials entrapped in the pile.

In a further embodiment, polyester filament fabrics may lose their undesirable "plastic-like" feel and the hand of such fabrics may become more similar to fabrics made entirely from natural fibers such as wool or cotton.

The invention and in particular the apparatus thereof may be further understood by reference to the drawings. In particular, FIG. 1 is a preferred apparatus of the invention which may be used to carry out the process of the invention, and the invention be fully understood by reference to the detailed description of the drawings.

FIGS. 2 through 5 are schematic views of the action sequence of a set of flexible impact means simultaneously impacting on the face and the back of a fabric disposed between them.

Referring now to the drawings and in particular to FIG. 1, the textile material 2 is unrolled from a supply roll 4 and led to guide roll 6 over dancer roll 8 to guide roll 10 and then to guide rolls 12 and 14. Guide rolls 6, 10, 12 and 14 may either be fixed or idling rolls; guide rolls 6 and 10 in conjunction with dancer roll 8 serve to control the tension of the material during processing. A loop control device or other well-known apparatus may be employed instead of dancer roll 8 if it is desired to process the material with substantially no tension. Guide rolls 12 and 14 function to position the direction of the material so that its continued path will be in approximately the vertical direction. The path of the material continues between stabilizer bars 16 and 18 into the first processing station and then between stabilizer bars 36 and 38 into the second processing station. From there the material is led between stabilizer bars 48 and 50 over guide rolls 52 and 54 which serve to change the direction of the material, which then moves to take-up roll 56 onto which it is wound.

Stabilizer bar sets 16 and 18, 36 and 38, and 48 and 50 are vertically and horizontally adjustable. Their exact location with regard to the material, the treatment area, and to each other determines the precise path of the material through the first and second treatment stations and together with the material tension and characteristics of the flaps, the location of the guide bars also determines the degree to which the material during treatment can be deflected from the plane in which it travels. As a rule the stabilizer bar sets will be adjusted to position the material so that it will pass in a plane that is substantially equidistant from flap rolls 24 and 26 and flap rolls 40 and 42. Attached by suitable means to rolls 24 and 26 and 40 and 42 are flaps 28a-d and 30a-d and 44a-d and 46a-d. The flaps may be installed as illustrated by simply bolting them onto the flap roll by means of clamping bars 32 in FIG. 1 so that when the rolls are at rest the plane of a flap is essentially tangential to the rolls. In this embodiment, when the flap rolls are rapidly rotated, the centrifugal force will extend them substantially radially from the roll. The flaps may also be installed so that they extend radially from the flap roll even while the roll is at rest, i.e., in the absence of centrifugal forces. The flaps may be made of a wide variety of suitable reinforced or non-reinforced materials such as neoprene rubber, urethane, polyvinyl chloride, nylon, or even steel and other sheet materials as well as composites thereof of sufficient durability and flexibility to accomplish the desired result. Flap rolls 24 and 40 may be driven by motor 58 via drive shaft 60, pulleys 62, 66, 68 and 72, belts 64 and 70 and shafts 74 and 76. Flap rolls 26 and 42 may be driven by motor 78 via drive shaft 80, pulleys 82, 86, 88 and 92, belts 84 and 90 via shafts 93 and 94.

When in operation, flap rolls 24 and 26 rotate as do flap rolls 40 and 42. The distance between flap rolls 24 and 26 and flap rolls 40 and 42, respectively, is adjusted so that in the absence of material 2 the flaps would impinge upon each other to a predetermined depth of the flaps. When the machine is operating and threaded up with material 2, flaps 28a-d, 30a-d, 44a-d and 46a-d will be extended substantially radially by centrifugal force from the rapidly rotating rolls 24 and 26 and 40 and 42, respectively, and will intermittently and simultaneously impact the material with considerable force. Of course, the flaps which are impacting the material will be deflected from their radial extension as a result of such impact.

Depending upon the desired effect, the flap rolls 24 and 26 and the flap rolls 40 and 42 may independently be rotated either clockwise or counterclockwise. Preferably, however, corresponding flap rolls on opposing sides of the material are rotated in the same direction so that the force of impact and shearing forces imparted to the fabric are magnified. Speed of rotation of flap rolls may also vary widely depending upon the desired effects as described below.

It should be noted that while FIG. 1 illustrates only two treatment stations, both of which are of the same type, the actual apparatus may include only one station or alternatively two or more stations, e.g., three, four or even more stations may be provided on the apparatus for treatment of the material.

FIGS. 2 through 5 present a more detailed schematic view of the action sequence of a set of flexible impact means simultaneously impacting on the face and the back of a fabric disposed between them. In FIG. 2, the fabric 2, confined between stabilizer bar sets 16 and 18 and 36 and 38 and being under very little or no tension, is in contact with flaps 28 and 30 on flap rolls 24 and 26. The flaps originally extending substantially radially from the flap rolls either by the method of attachment to the flap rolls or by centrifugal force or both are deflecting the fabric from its original straight path and the flaps themselves, due to the interaction with the fabric, have started to bend slightly from their straight configuration. In FIG. 3, in which the flaps have moved closer to each other, more force is exerted between the fabric 2 and flaps 28 and 30 resulting in an increased bending of flaps 28 and 30 due to the increased force of action between the flaps and the fabric. In FIG. 4, the flaps 28 and 30 have just impacted simultaneously onto the fabric 2 disposed between them exerting at that moment a compressing force. In FIG. 5, flaps 28 and 30 are more severely bent near the point of their attachment to flap rolls 24 and 26; but in the impact area, due to the force of impact, have straightened and are gliding past each other with the fabric 2 disposed between them. At this point, very considerable compressive force is exerted onto the fabric between the flaps as well as a considerable shear force which has its cause in the compressive force discussed above and the simultaneous sliding of the two flaps past each other on each side of the fabric.

According to the process of the present invention, the material is ordinarily extended to its open width and may preferably be moved in the warp or longitudinal direction. The mechanical impact may be described as being of a force and frequency sufficient to cause a substantially uniform modification of the material. As will be apparent to those skilled in the art, the extent of modification of the material, the specific effects obtained, and the rate at which these effects may be obtained will depend upon the operating parameters of the machine used in the process and the nature of the material being treated. Relevant operating parameters include, for instance, force and frequency of impact, length of material trapped between opposing impact means, e.g., flaps during impact, friction between flap and fabric surfaces and even the linear speed of the material relative to the impact means. Some or all of these parameters are in turn a function of the radius of the flap roll, flap length, bending modulus of the flaps, specific gravity or density of the flaps, the extent to which the flaps interpenetrate one another with the material disposed between them, the speed of rotation of the flap rolls, and the surface characteristics of both the flaps and the fabric. In general, it has been found that the flap rolls will rotate at speeds of from about 100 to about 8,000 rpm's, preferably from about 500 to about 6,000, e.g., about 1,000 to about 4,000 rpm's. The linear speed of the material relative to the impact means may vary from about 1 yard to about 200 yards per minute, and will preferably be between about 5 and about 100 yards per minute, depending upon the number of treatment stations available, the type of material and intensity and character of the treatment desired.

I have illustrated and described what I consider to be the preferred embodiments of my invention. It will be apparent, however, that various modifications may be resorted to without departing from the broader scope of the invention as defined by the claims. The invention may be further understood by reference to the following examples which are not to be construed as limiting the invention.

EXAMPLE 1

A precure, permanent press, soil release, finishing formulation containing carbamate resin, polymeric acrylic acid-based soil release agent, a combination of moderate amounts of high density polyethylene and polycondensate softening agents was applied to a white polyester/cotton fabric woven in a herringbone construction from 65/35 percent spun polyester/cotton warp and fill yarns. After drying and curing of the finish, the fabric which weighed 5.7 ounces per square yard was treated in two passes at 10 yards per minute according to the process of the invention using the apparatus described in FIG. 1.

As to the specific processing specifications employed, the flap roll diameter was 4 inches. The length of the flaps extending from the roll was 2.5 inches. There were eight flaps attached to each roll and the flaps were constructed from 3 ply fabric reinforced red neoprene rubber. The "fabric free" length, that is the distance between the stabilizer bars over which the fabric travels above and below the flap roll positions was 8 inches. Fabric tension was about 20 pounds. The flap rolls were rotated at 2380 rpm's with both flap rolls rotating in the clockwise direction.

After processing, it was observed that the fabric had acquired a softer, warm, supple and much lighter hand. Upon further analysis, it was determined that the thickness of the treated fabric as measured by ASTM Test Number D-1777 was increased by 24 percent, the drape coefficient was decreased by 35 percent, warp and fill stretch were increased by 43 percent and 13 percent, respectively. Opacity was increased by 8 percent. Opacity was measured by the test method reported in patent application Ser. No. 128,619 filed Mar. 10, 1980, entitled Polyester Textile Materials Having Improved Opacity, now U.S. Pat. No. 4,283,452. Fabric weight remained substantially unchanged. It was apparent from the tests which were conducted on the textile material that in addition to increasing the fiber-to-fiber and yarn-to-yarn mobility of the fabric, the treatment resulted in a substantial "locsening up" and fulling of the fabric structure.

EXAMPLE 2

The finish described in Example 1 was applied to a white polyester/cotton lefthand twill fabric prepared from 65/35 percent polyester/cotton spun warp and fill yarns. After drying and curing, the fabric which weighed 5.5 ounces per square yard was observed to have a somewhat firm, raspy, papery hand. After treatment according to the process of the invention as described in Example 1, the fabric exhibited a less papery, softer, fuller and more pleasing hand. The fabric weight remained unchanged, but the fabric thickness increased by 140 percent, with a decrease in fabric drape coefficient of 9 percent. Warp and fill stretch increased by 14 percent and 9 percent, respectively.

EXAMPLE 3

A plain weave fabric made from 65/35 percent polyester/cotton warp and fill yarns was treated using the same finish as described in Example 1, dried and cured. The finished fabric, weighing about 5.4 ounces per square yard, had a somewhat raspy and stiff, papery hand. After treatment according to the invention as described in Example 1, the fabric was observed to have a considerably smoother, more pleasing surface hand and a softer and less papery overall hand. The weight of the fabric in ounces per square yard decreased by approximately 4 percent. The fabric thickness had increased by 200 percent and warp and fill stretch increased by 11 and 10 percent, respectively.

EXAMPLE 4

A polyester/cotton fabric constructed in a lefthand twill weave from 65/35 percent polyester/cotton warp and fill yarns was range dyed to a brown color. The fabric was then treated with a precure, crease resistant finishing formulation designed for heavier weight fabrics containing dihydroxydimethylolethylene-urea resin, modest amounts of high density polyethylene and nonionic ethoxylated fatty ester softeners, wetting agents, pH control agents and catalysts. The fabric was then dried and cured and was determined to have a weight of 7.5 ounces per square yard. The fabric was observed to have a rather raspy surface hand and a firm, boardy overall hand. This fabric was then processed as described in Example 1; and after processing it was observed to have a much more pleasing, smoother surface hand and a considerably softer overall hand. The fabric weight was substantially unchanged, and the fabric drape coefficient was decreased by 15 percent.

EXAMPLE 5

An 80/20 percent polyester/cotton fabric constructed in a plain weave from 65/35 percent spun polyester/cotton warp yarn and texturized filament polyester fill yarn was range dyed a blue color. Then a permanent press, soil release, postcure finishing formulation containing dihydroxydimethylolethylene-urea resin, high density polyethylene softener, ethoxylated castor oil softener, acrylic acid based polyacrylic soil release chemical, catalyst and wetting agent was applied to the fabric which was then dried and cured. The finished fabric weighed 4.9 ounces per square yard and was observed to have a cold, somewhat plastic and very firm hand. After treatment of the fabric according to the process of the invention as described in Example 1, the fabric was observed to have a more pleasing, somewhat softer, more acceptable hand. The fabric weight remained substantially unchanged. Fabric thickness increased by about 10 percent and the fabric stretch increased by 50 percent in the warp direction and decreased by 11 percent in the fill direction.

EXAMPLE 6

An 80/20 percent polyester/cotton fabric constructed in a lefthand twill weave from spun 65/35 percent polyester/cotton warp yarn and 100 percent texturized polyester fill yarn was range dyed a burgundy color. To this range dyed fabric was applied an extra soft, precure, permanent press finishing formulation containing dihydroxydimethylolethylene-urea resin, significant amounts of high density polyethylene softener, nonionic ethoxylated fatty ester softener, ethoxylated castor oil softener as well as catalyst and wetting agent. After drying and curing of the fabric, it was observed to have a rather hard, plastic hand. A sample of this fabric was then processed according to the process of the invention as described in Example 1 in the warp direction and a separate sample was processed in an identical manner in the filling direction. Both of the samples so processed were observed to have a much more supple, softer and pleasing hand. The first desirable hand was observed in the sample which was processed in the warp direction, although both samples were generally improved. The warp stretch increased by about 25 percent for the sample processed in the warp direction and for the sample processed in the filling direction, a drape coefficient decrease of about 19 percent was observed. No other significant measurable changes were observed in the fabric which was processed according to the invention in either the warp or fill directions.

EXAMPLE 7

A rayon drill was woven from 100 percent spun high wet modulus rayon warp and fill yarns. This greige fabric which had a weight of 3.8 ounces per square yard was observed to have a very raspy and very stiff surface feel. The fabric was then processed according to the invention as described in Example 1, and it was observed that the surface feel of the treated fabric became dramatically softer, fuller and much more pleasing. While only small changes were effected in weight and thickness, the stretch in the warp and fill directions was very significantly increased by about 40 percent.

EXAMPLE 8

A polyester/cotton twill fabric constructed from 75/25 percent polyester/cotton warp and fill yarns was severely napped and then coated with a coating formulation consisting substantially of acrylic polymer. After drying and curing, the resultant fabric weighed about 9 ounces per square yard and was very stiff. This fabric was then processed according to the invention as described in Example 1, and the fabric was softened dramatically. Warp and fill stretch were increased by 78 percent and 100 percent, respectively.

EXAMPLE 9

A napped substrate coated by a coagulation coating process using a coating formulation weighed 8.1 ounces per square yard and was observed to have a waxy, rubbery surface feel. After processing according to the invention as described in Example 1, the fabric had a very pleasing, soft hand and a very soft, pleasing suface feel. The fabric thickness was increased by 10 percent. Fabric drape coefficient was decreased by 12 percent, and the fabric stretch was increased by 50 percent in the warp and 13 percent in the fill directions, while the fabric weight was not significantly changed.

EXAMPLE 10

A non-woven, white 2.7 ounce per square yard nylon fabric was subjected to the process of the invention described in Example 1. The very slick, plastic surface hand of the untreated fabric prior to processing was changed after processing to a warmer, softer surface feel. The fabric weight was increased by 13 percent. Its thickness was increased by 18 percent and fabric stretch was increased by 16 percent in the length direction and 36 percent in the width direction.

EXAMPLE 11

An 18 cut doubleknit fabric was prepared from 1/33 acrylic and 1/150/34 texturized polyester yarns and dyed green. The fabric had a finished weight of 7.0 ounces per square yard. After treatment of the fabric according to the process described In Example 1, the fabric had a woolier, heavier hand and more body. Fabric weight was increased by 16 percent per unit area. The thickness was increased by 48 percent and fabric drape was reduced by 35 percent. Fabric stretch in the length direction decreased by 37 percent, and it increased in the width direction by 282 percent. The width of the sample decreased by 33 percent and the length increased by 13 percent. Overall, the treatment had a very significant fulling effect on the fabric.

EXAMPLE 12

A white interlock fabric was knit from 1/70/34 texturized polyester filamentary yarns. A non-heat set sample of the fabric (sample A) had a weight of 3.3 ounces per square yard. A heat set sample (sample B) weighed 3.7 ounces per square yard. After treatment according to the process of the invention described in Example 1, the opacity of the sample A improved by 16 percent while its weight increased by 8 percent and its thickness decreased by 10 percent. Stretch in the length direction for Sample A was decreased by 22 percent and increased in the width direction by 25 percent. Opacity of sample B was improved by 4 percent. Weight increased by 4 percent, and thickness was not changed. The stretch in the length direction decreased by 9 percent and by 19 percent in the width direction.

EXAMPLE 13

A tufted upholstery fabric was prepared by tufting a 100 percent polyester spun yarn into a 100 percent polyester backing fabric woven from a 100 percent spun polyester warp yarn and a filament polyester filling yarn. The fabric was backcoated to obtain tuft retention and then jet rope dyed in a maroon color. The finished fabric was brushed and tip sheared and had a finished weight of 13.8 ounces per square yard. The fabric was was then treated by the process of the invention as described in Example 1 in two passes at 10 yards per minute. The fabric thickness increased by 3 percent and the fabric weight by 2.6 percent. The fabric appearance and fabric hand changed very significantly. The tuft yarns were partially untwisted; the tufts "bloomed," that is they were opened up, and the tufts were more erect, resulting in a fuller, more uniform, and more luxurious appearance. The fabric surface feel was much softer and silkier than that of the untreated sample.

What I claim is:

1. A continuous method for mechanically conditioning a fabric having a face side and a back side and a chemical finish thereon which restricts the relative mobility of yarns and fibers of the fabric comprising the steps: of moving the fabric in a longitudinal direction along an axis, locating a first roll with flexible flaps thereon adjacent the face side of the fabric, locating a second roll with flexible flaps thereon on the opposite side of the fabric adjacent the back side of the fabric, rotating the first roll to cause one of the flaps thereon to impact the face side of the fabric and push the fabric at the point of impact outward away from the fabric axis, rotating the second roll in the same direction as the first roll to cause one of the flaps thereon to impact the back side of the fabric at a point spaced from the point of impact of the flap in the first roll to impel the fabric at the point of impact outward away from the fabric axis in a direction opposite to the outward movement caused by the flap on the first roll, said rolls being continuously rotated to cause the fabric between the points to be first compacted between the flaps and then sheared by the relative sliding movement of the flaps on both the face and back side of the fabric, and repeating the previous steps to impact the moveing fabric to enhance the relative mobility of the yarns and fibers in the fabric.

2. The method of claim 1 wherein the fabric is a polyester-cotton fabric having a resin thereon.

3. The method of claim 2 wherein the fabric has a warp component and is moved in the warp direction of the fabric.

* * * * *